United States Patent [19]

Debaes

[11] Patent Number: 5,076,331
[45] Date of Patent: Dec. 31, 1991

[54] PILE CUTTER FOR FACE TO FACE WEAVING LOOM

[75] Inventor: Johnny Debaes, Wenduine, Belgium

[73] Assignee: N. V. Michel Van de Wiele, Kortrijk-Marke, Belgium

[21] Appl. No.: 523,541

[22] Filed: May 15, 1990

[30] Foreign Application Priority Data

May 25, 1989 [BE] Belgium ............................ 08900567

[51] Int. Cl.$^5$ .............................................. D03D 39/18
[52] U.S. Cl. ................................ 139/291 C; 74/89.22; 474/136
[58] Field of Search ................. 83/614, 636, 639.1, 83/639.4; 74/10.7, 89.22; 474/136, 113, 114; 139/291 C; 26/8 C, 11, 12

[56] References Cited

U.S. PATENT DOCUMENTS

| | | | |
|---|---|---|---|
| 2,878,684 | 3/1959 | Kerfoot | 74/89.22 |
| 2,884,788 | 5/1959 | Clark | 74/89.22 X |
| 3,059,307 | 10/1962 | Riddle | 139/291 C |

FOREIGN PATENT DOCUMENTS 904573 10/1986 Belgium .
2852424 6/1980 Fed. Rep. of Germany .

Primary Examiner—Andrew M. Falik
Attorney, Agent, or Firm—James Creighton Wray

[57] ABSTRACT

Cutting device for face-to-face weaving loom, having a cutting rail (2) on which a cutting carriage (4) moves to and fro and is connected to a rope (6) which forms a closed circuit with the cutting carriage (4) and moves to and fro, being driven by a reciprocating rotary drum (7). One or more parts of the rope are deflected around guide rollers (11, 12), (24, 25), (16, 17, 18), so that together they cause an S-shaped deflection lying both between the main frame (1,1') and a side frame (10, 19) and between the main frames (1, 1') themselves, in the same plane, with a deflection angle of at least 150 degrees.

16 Claims, 1 Drawing Sheet

PILE CUTTER FOR FACE TO FACE WEAVING LOOM

FIELD OF THE INVENTION

This invention provides a cutting device for face-to-face weaving loom, more particularly drive for such cutting device, and weaving loom equipped with such cutting device.

The invention relates to the cutting device of a face-to-face weaving loom. Such a cutting device cuts through the pile yarns connecting the two backing fabrics, so that two separate pile fabrics are obtained.

More particularly, the invention relates to the drive for the cutting carriage of such a cutting device. The cutting carriage moves to and fro over the cutting rail, set up over the width of the weaving loom, and cuts through a series of pile yarns on each run.

BACKGROUND OF THE INVENTION

The hiterto known drives for such a cutting device essentially comprise a crank or puller which is driven from the drive of the weaving loom by means of a crank mechanism or rotating crank mechanism, and which swings to and fro over a limited sector of a circle. The end of said crank or means interacts with a pulley block whose rope is guided over the width of the weaving loom and along the cutting rail and is connected to the cutting carriage. The pulley block converts the relatively short stroke length of the end of the crank or puller end into a stroke length which corresponds to the desired movement of the cutting carriage.

The disadvantage of this drive is twofold. On the one hand, this drive is difficult to adapt to the width of fabric. On the other hand, there is the heavy mass of the drive. The inertia of this mass limits the frequency of the to and fro movement of the cutting carriage, and thus the speed of revolution of the weaving loom.

Another existing drive comprises a crank mechanism coupled to a toothed sector, in turn coupled via a transmission to a drum on which a rope connected to the cutting carriage winds on or off on the width of drum provided for this purpose. This drive also has the disadvantage that it is not suitable for high speeds, given the mass effect of both the toothed sector and the drum.

In another existing drive the rope is made to run on a series of rollers mounted unsupported on the same shaft, the common shaft of which moves to and fro, being driven by a cycloidal system.

However, at the high speeds which are being used with increasing frequency in the weaving loom, increasing vibrations occur on the rope, thereby causing breakage, with the result that the loss from lost production is even higher through these higher speeds.

SUMMARY OF THE INVENTION

The object of the invention is to give the cutting device greater reliability in operation in order to eliminate these disadvantages.

The cutting device according to the invention for a face-to-face weaving loom comprises a cutting rail on which a cutting carriage moves to and fro. This cutting carriage is connected to a rope which is guided by means of guide pulleys along the cutting rail over the width of the weaving loom. The rope with the cutting carriage forms a closed circuit and moves to and fro, being driven by a reciprocating rotary drum, while the rope is held in that state by means of at least one system of two guide pulleys which makes the rope follow an S-shaped circuit in the same plane, with an arc of contact of at least 150° with the particular guide pulley in each case.

DETAILED DESCRIPTION OF THE DRAWING

Figure 1:
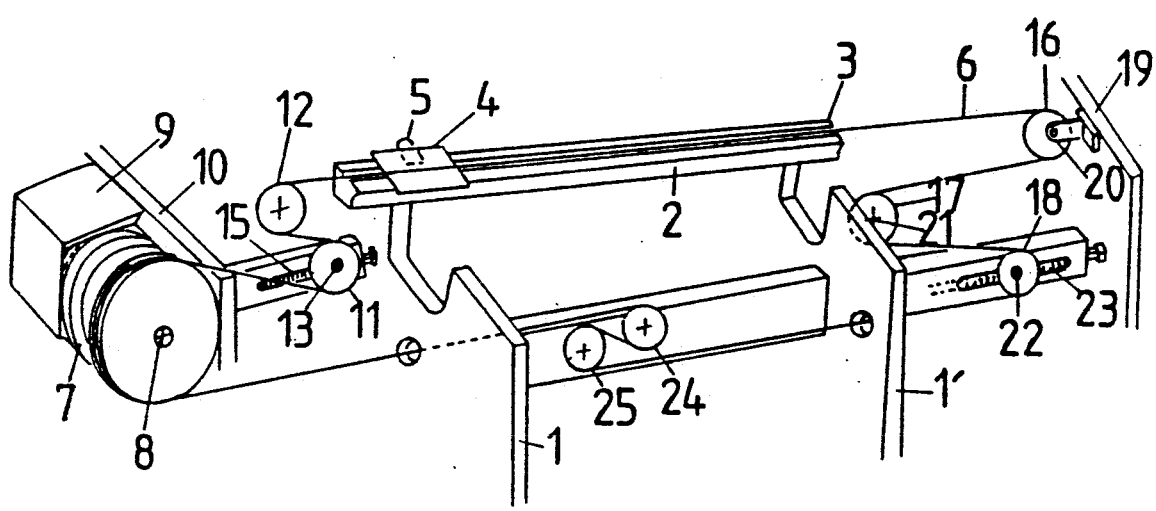
FIG. 1 is a perspective view of a cutter device and drive in a face-to-face weaving loom.

Further characteristics and advantages will emerge from the description which follows here of a cutting device according to the invention for face-to-face weaving looms, with reference to the appended FIG. 1, which is a schematic representation of such a cutting device drive and loom.

The central main frames (1 and 1') of a face-to-face weaving loom have on them a cutting rail (2) which extends over the width of the weaving loom and is provided with a groove (3) containing the rope (6) and also with a dovetail guide on which a cutting carriage (4), provided with a cutter (5), moves to and fro.

The cutting carriage (4) is firmly connected to a rope (6) with a closed circuit. In the particular embodiment of the cutting device according to the invention shown in FIG. 1, the rope (6) is wound in various turns on a drum (7), the shaft (8) of which is given a reciprocating rotary movement from a so-called planetary or epicyclic gearbox (9). The planetary gearbox (9) is fixed to a side frame (10) of the weaving loom, to which a first system of two guide pulleys (11 and 12) is also fixed between the side frame (10) and main frame (1), and around which the rope makes an S-shaped circuit between the drum (7) and one side of cutting rail (2). This S-shaped circuit lies in a plane formed by the throat lines of the guide pulleys. Guide pulley (11) is rotatably mounted on shaft (13), which is arranged in such a way that it is movable and the movement is carried out by means of a spindle (15). Guide pulley (12) is arranged in such a way that the rope (6) runs in groove (3) and pulls the cutting carriage (4) gently on the cutting rail. Guide pulley (11) is arranged in such a way that together with guide pulley (12) it causes an S-shaped deflection of the rope in only one plane, and that the deflection angles on the guide pulleys are at least 150°.

At the other side of the cutting rail (2) lies a second set of three guide pulleys (16, 17 and 18), by means of which the rope (6) makes a double S-shaped deflection in the same plane. Guide pulleys (16, 17 and 18) are rotatably mounted on their respective shafts (20, 21 and 22); shaft (20) is fixed on a carrier to the side frame (19); shaft (21) is fixed on a carrier of the main frame (1'). Shaft (22) of guide pulley with spindle (23) is organized at a certain distance from shaft (21), so that the deflection angles of the rope (6) on guide pulleys (16, 17 and 18) are at least 150° and the pretensioning of the rope can be regulated as desired.

Between the main frames (1 and 1') on the returning part of the rope (6) to the other side of the drum lies a third set of two guide pulleys (24 and 25), around which the rope (6) makes an S-shaped deflection, in which the deflection angles are at least 150°.

With this arrangement of the guide pulleys, in the first place, the free span length of the rope is limited, so that the occurence of transverse vibration antinodes on the rope is counteracted. Secondly, through the relatively large deflection angle of at least 150° of rope around guide pulley, the slip between rope and guide pulley is limited in such a way that the rope is subject to less wear. Thirdly, this arrangement means that the rope is deflected in only one direction, as a result of which the service life of the rope is appreciably increased, even at higher speeds of the weaving loom.

While the invention has been described with reference to specific embodiments, modifications and variations of the invention may be constructed without departing from the scope of the invention, which is described in the following claims.

I claim:

1. Drive for a cutting device of a face-to-face weaving loom, the cutting device drive comprising a cutting rail on which a cutting carriage moves reciprocally, the drive comprising a rope which is connected to the cutting carriage, which forms a closed circuit with the cutting carriage and which reciprocally moves, the cutting carriage on the rail, the rope being driven by a reciprocating rotary drum, characterized in that a first part of the rope coming directly from the drum is deflected at a certain distance by a first set of plural guide pulleys comprising a first guide pulley of the set in conjunction with a second guide pulley of the set, so that together they cause an S-shaped deflection of the rope lying between a first side frame and a first one of two main frames of the weaving loom.

2. Drive for the cutting device of a face-to-face weaving loom according to claim 1, characterized in that a second part of the rope coming directly off the drum is deflected at a certain distance by a second set of plural guide pulleys, so that the rope undergoes an S-shaped deflection and lies between the two main frames of the weaving loom.

3. Drive for the cutting device of a face-to-face weaving loom according to claim 2, characterized in that the transition from the first rope part to the second rope part comprises a double S-shaped deflection around a third set of plural guide pulleys lying between a second one of the two main frames and a second side frame at a side of the main frame away from that of the rotary drum.

4. Drive for the cutting device of a face-to-face weaving loom according to claim 3, characterized in that the S-shaped deflections have such an arrangement of the interacting pulleys that the deflection angles are at least 150 degrees.

5. Drive for the cutting device of a face-to-face weaving loom according to claim 3, characterized in that the S-shaped deflections around the first, second and third sets of guide pulleys take place in one plane.

6. Drive for the cutting device of a face-to-face weaving loom according to claim 5, characterized in that at least one of each set of guide pulleys by means of which the rope is given an S-shaped deflection is movably fixed so that said pulley can move relative to the corresponding guide pulley of the set.

7. Drive for the cutting device of a face-to-face weaving loom according to claim 6, characterized in that the displacement of the movably fixed guide pulley is carried out by means of a controllable spindle.

8. Cutting device for a weaving loom equipped with a drive, the cutting device comprising a cutting rail on which a cutting carriage reciprocally moves and, the cutting carriage is connected a rope which forms a closed circuit with the cutting carriage and which reciprocally moves the cutting carriage, the rope being driven by a reciprocating rotary drum, characterized in that a first part of the rope coming directly from the drum is deflected at a certain distance by a first set of plural guide pulleys comprising a first guide pulley of the set in conjunction with a second guide pulley of the set, so that together they cause an S-shaped deflection of the rope lying between a first side frame and first one of two main frames of the weaving loom.

9. Weaving loom equipped with a cutting device, the cutting device comprising a cutting rail on which a cutting carriage reciprocally moves while being connected to a rope which forms a closed circuit with the cutting carriage and which reciprocally moves the cutting carriage, the rope being driven by a reciprocating rotary drum, characterized in that a first part of the rope coming directly from the drum is deflected at a certain distance by a first set of plural guide pulleys comprising a first guide pulley of the set in conjunction with a second guide pulley of the set, so that together they cause an S-shaped deflection of the rope lying between a first side frame and first one of two main frames of the weaving loom.

10. A face-to-face weaving loom having a frame, a cutting rail connected to the frame, a pile-cutting device mounted on the cutting rail and a drive connected to the cutting device, the cutting device comprising a cutting carriage mounted on the rail for reciprocally moving, the drive comprising a rope which forms a closed circuit connected to the cutting carriage for reciprocally moving the carriage, and a reciprocating rotary drum mounted on the frame and connected to the rope for moving the rope to and fro, characterized in that plural guide pulleys in at least one set mounted on the frame and connected to a part of the rope coming directly from the drum deflect a first portion of the rope by a first guide pulley in the set in conjunction with a second guide pulley in the set and for together causing an S-shaped deflection in the first portion of the rope.

11. The face-to-face weaving loom according to claim 10, further comprising a second set of plural guide pulleys mounted on the frame and connected to another part of the rope coming directly off the winding and unwinding drum for deflecting the rope in an S-shaped deflection in a second portion of the rope.

12. The face-to-face weaving loom according to claim 11, further comprising a third set of plural guide pulleys mounted on the frame opposite the drum for transitioning the rope from the first rope portion to the second rope portion in a double S-shaped deflection.

13. The face-to-face weaving loom according to claim 12, characterized in that the S-shaped deflections around the sets of guide pulleys lie in one plane.

14. The face-to-face weaving loom according to claim 12, characterized in that at least one of the guide pulleys by which the rope is given an S-shaped deflection has an adjustment for moving the guide pulley relative to another guide pulley in the same set.

15. The face-to-face weaving loom according to claim 12, further comprising a controllable spindle connected to at least one guide pulley for mounting and displacing the guide pulley.

16. The face-to-face weaving loom according to claim 12, characterized in that the S-shaped deflections have angles of at least 150 degrees.

* * * * *